Patented July 13, 1937

2,087,200

UNITED STATES PATENT OFFICE 2,087,200

VULCANIZATION OF RUBBER

Albert M. Clifford, Stow, Ohio, assignor to Wingfoot Corporation, Wilmington, Del., a corporation of Delaware No Drawing. Application July 23, 1936, Serial No. 92,143

18 Claims. (Cl. 18—53)

This invention relates to the vulcanization of rubber and, more particularly, to a new class of accelerators for the vulcanization thereof. The compounds of the invention are halo alkyl aryl thiazyl sulphides and may be represented by the formula

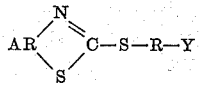

wherein AR is an ortho aromatic radical, R is a alkane group containing not more than two carbon atoms, and Y is a halogen atom. The compounds are particularly valuable accelerators when employed in conjunction with an activating basic-nitrogen containing accelerator.

Particularly preferred are the compounds where R is CH₂ and Y is chlorine. Also, those compounds where AR is a member of the benzene and naphthalene series are preferable.

Further illustrating the invention, 197 parts of benzothiazyl 1-thio methylene hydrin and 137.5 parts of phosphorus trichloride (50% excess) were mixed in an open vessel and stirred. An exothermic reaction started immediately accompanied with the evolution of hydrogen chloride gas. On cooling, the product crystallized and gave a quantitative yield of crude product melting at 112–118° C. The product was then recrystallized several times from ethylene dichloride, whereupon chloro methyl benzothiazyl sulphide, or as it may be called, benzothiazyl 1-thio chloro methane, was obtained in substantially pure form melting at 127–128° C. It contained an average chlorine analysis of 16.63% and an average nitrogen analysis of 6.48% as compared with the theoretical chlorine and nitrogen percentages for chloro methyl benzothiazyl sulphide of 16.45% and 6.50%, respectively. The equation representing the reaction is believed to be as follows:

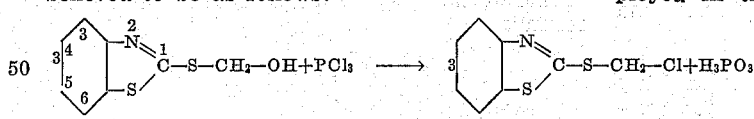

Other members of the alkane series may be prepared similarly simply by employing the homologous benzothiazyl 1-thio alkylene hydrin. Beta chloro ethyl benzothiazyl sulphide has been prepared similarly and is a crystalline compound melting over the somewhat indefinite range of 178–214° C. It contained an average nitrogen content of 5.95%, an average sulphur content of 27.58% and an average chlorine content of 15.08% as compared with the theoretical nitrogen, sulphur and chlorine contents for this compound of 6.10%, 27.92% and 15.44%, respectively.

Beta chloro ethyl benzothiazyl sulphide may also be prepared by refluxing for a period of one hour one mol. of sodium benzothiazyl mercaptide and 1.5 mols of ethylene dichloride in 300 cc. of water and 450 cc. of ethyl alcohol. The product was permitted to cool and upon the addition of water thereto an oily layer formed. The oil was separated from the remaining materials and the low boiling constituents thereof were removed by heating to 100° C. at a pressure of 30–40 mm. 168.6 grams of material remained, which on standing, partially solidified. The crude reaction product was then stirred with 250 cc. of acetone and the solid filtered off. The solid material was extracted with boiling xylene, and the insoluble residue which was recovered melted at 174–214° C. From alcohol the compound crystallizes with alcohol of crystallization which decomposes at 105° C. to a solid melting point 167–169° C.

This compound, beta chloro ethyl benzothiazyl sulphide, melting at 174–214° C., was heated at a temperature of 125–140° C. for 15 minutes and yielded a solid melting at 238–239° C. On recrystallization from alcohol maintained at room temperature, this solid melted with decomposition starting at 105° C. and being completely melted at 168–169° C. In another recrystallization from hot alcohol the product obtained melted at 168–169° C. Analyses for the compound melting at 238–239° C. gave an average nitrogen content of 6.06% and an average chlorine content of 15.15%, showing it to be beta chloro ethyl benzothiazyl sulphide. It appears that this compound exists in two crystalline forms. The equation representing the reaction is as follows:

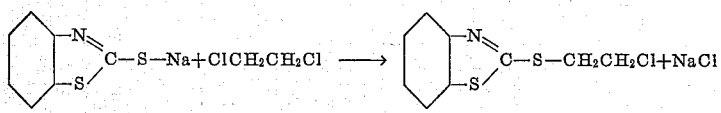

While mercaptobenzothiazole has been employed in the examples and is the preferred thiazole of the invention, other 1-mercapto aromatic thiazoles may be employed in its stead in preparing the accelerators of the invention. Illustrative are 1-mercapto 4-nitro benzothiazole, 1-mercapto 5-nitro benzothiazole, 1-mercapto 3-phenyl benzothiazole, 1-mercapto 4-chlor benzothiazole, 1-mercapto 3-methyl benzothiazole, 1-mercapto 5-hydroxy benzothiazole, 1-merpound melting over the somewhat indefinite range of 178–214° C. It contained an average nitrogen content of 5.95%, an average sulphur content of 27.58% and an average chlorine content of 15.08% as compared with the theoretical nitrogen, sulphur and chlorine contents for this compound of 6.10%, 27.92% and 15.44%, respectively.

capto 6-ethyl benzothiazole, 1-mercapto 3-5-dimethyl benzothiazole, 1-mercapto 5-ethoxy benzothiazole, 1-mercapto 4-methoxy benzothiazole, 1-mercapto alpha naphthathiazole, 1-mercapto beta naphtha thiazole, and other nitro-, amino-, hydroxy-, alkyl-, aryl-, alkoxy- and halo-substituted mercapto aryl thiazoles.

Similarly, other halo compounds instead of the chlorine compounds of the examples may be prepared. Illustrative are brom methyl benzothiazyl sulphide and beta brom ethyl 5-nitro benzothiazyl sulphide. Other compounds of the invention are chlor methyl 3-tolyl thiazyl sulphide, chlor methyl 6-anisyl thiazyl sulphide, etc.

The compounds of the invention may be employed as accelerators in practically any of the standard rubber formulae, although they are preferably used in conjunction with activating basic-nitrogen accelerators, such as diphenylguanidine, diortho tolyl guanidine, urea, ammonia, dibenzyl amine, butyl ammonium oleate, diphenylguanidine neutral phthalate, diortho tolyl guanidine neutral succinate and the poly ethylene poly amines. Illustrative of one formula found particularly satisfactory is the following:

|  | Parts by weight |
|---|---|
| Extracted pale crepe rubber | 100 |
| Zinc oxide | 5.0 |
| Sulphur | 3.0 |
| Stearic acid | 1.5 |
| Diphenylguanidine | 0.2 |
| Chlor methyl benzothiazyl sulphide | 0.5 |

Results obtained by the use of this formula are summarized in the following table:

| Cure in mins. °F. | Ultimate tensile | Maximum elongation | Stress 500% | kgs./cm.² 700% |
|---|---|---|---|---|
| 20/260 | 9 | 800 | 4 | 6 |
| 40 | 102 | 900 | 12 | 33 |
| 60 | 130 | 800 | 21 | 72 |
| 80 | 162 | 800 | 25 | 90 |

The compounds of the invention thus possess valuable properties as accelerators of vulcanization. They have an excellent delayed action effect. The halo methyl aryl thiazyl sulphides are in general, however, more powerful accelerators than the halo ethyl compounds.

This application is in part a continuation of application Serial No. 53,427, filed December 7, 1935.

It is intended that the patent shall cover, by suitable expression in the appended claims, all features of patentable novelty residing in the invention.

What I claim is:

1. The process which comprises vulcanizing rubber in the presence of a basic nitrogen-containing accelerator and chloro methyl benzothiazyl sulphide.

2. The process which comprises vulcanizing rubber in the presence of a basic nitrogen-containing accelerator and beta chloro ethyl benzothiazyl sulphide.

3. The process which comprises vulcanizing rubber in the presence of a basic nitrogen-containing accelerator and a compound having the formula

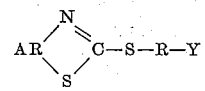

wherein AR is an ortho arylene radical of the benzene and napthalene series, R is —CH$_2$— and Y is chlorine.

4. The process which comprises vulcanizing rubber in the presence of a basic nitrogen-containing accelerator and a compound having the formula

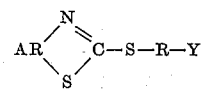

wherein AR is an ortho arylene radical of the benzene and naphthalene series, R is an alkane group containing not more than two carbon atoms and Y is halogen.

5. The process which comprises vulcanizing rubber in the presence of a basic nitrogen-containing accelerator and a compound having the formula

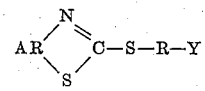

wherein AR is an ortho arylene radical of the benzene and naphthalene series, R is —CH$_2$— and Y is halogen.

6. The process which comprises vulcanizing rubber in the presence of chloro methyl benzothiazyl sulphide.

7. The process which comprises vulcanizing rubber in the presence of a compound having the formula

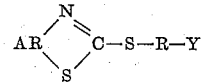

wherein AR is an ortho aromatic radical of the benzene and naphthalene series, R is a group selected from the group consisting of CH$_2$ and (CH$_2$)$_2$, and Y is halogen.

8. The process which comprises vulcanizing rubber in the presence of a compound having the formula

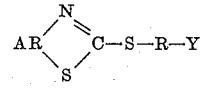

wherein AR is an ortho aromatic radical of the benzene and naphthalene series, R is a group selected from the group consisting of CH$_2$ and (CH$_2$)$_2$ and Y is a halogen atom of the group consisting of chlorine and bromine.

9. The process which comprises vulcanizing rubber in the presence of a compound having the formula

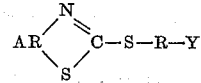

wherein AR is an ortho aromatic radical of the benzene and naphthalene series, R is CH$_2$ and Y is chlorine.

10. The vulcanizates obtainable according to the process of claim 1.

11. The vulcanizates obtainable according to the process of claim 2.

12. The vulcanizates obtainable according to the process of claim 3.
13. The vulcanizates obtainable according to the process of claim 4.
14. The vulcanizates obtainable according to the process of claim 5.
15. The vulcanizates obtainable according to the process of claim 6.
16. The vulcanizates obtainable according to the process of claim 7.
17. The vulcanizates obtainable according to the process of claim 8.
18. The vulcanizates obtainable according to the process of claim 9.

ALBERT M. CLIFFORD.